US011068332B2

(12) United States Patent
Chopra et al.

(10) Patent No.: US 11,068,332 B2
(45) Date of Patent: Jul. 20, 2021

(54) METHOD AND SYSTEM FOR AUTOMATIC RECOVERY OF A SYSTEM BASED ON DISTRIBUTED HEALTH MONITORING

(71) Applicant: EMC IP Holding Company LLC, Hopkinton, MA (US)

(72) Inventors: Shelesh Chopra, Bangalore (IN); Jayashree B. Radha, Bangalore (IN); Aaditya Rakesh Bansal, Bangalore (IN); Sunil K. Yadav, Bangalore (IN); Manish Sharma, Bangalore (IN); Amit Jain, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 16/396,535

(22) Filed: Apr. 26, 2019

(65) Prior Publication Data
US 2020/0341835 A1 Oct. 29, 2020

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 11/0772* (2013.01)

(58) Field of Classification Search
CPC ............ G06F 11/2028; G06F 11/3055; G06F 11/1464; G06F 11/2069; G06F 11/3006; G06F 11/0754; G06F 11/0757; G06F 11/0793
See application file for complete search history.

(56) References Cited

U.S. PATENT DOCUMENTS

| | | | | |
|---|---|---|---|---|
| 2004/0264481 A1* | 12/2004 | Darling | ............... | H04L 67/1017 370/401 |
| 2006/0239423 A1* | 10/2006 | Archer, Jr. | ........ | H04M 3/53325 379/88.18 |
| 2008/0059214 A1* | 3/2008 | Vinberg | .............. | G06F 21/6236 709/221 |

* cited by examiner

Primary Examiner — Charles Ehne
(74) Attorney, Agent, or Firm — Chamberlain, Hrdlicka, White, Williams & Aughtry (57) ABSTRACT

In general, embodiments of the invention relate to distributed monitoring of operations of production hosts and applications executing thereon. The distributed monitoring may enable more granular monitoring of production hosts and applications without increasing the overhead required to perform such monitoring, e.g., without substantially increasing the overhead on the production hosts or applications and/or without increasing the overhead of a management device that is managing the production hosts.

20 Claims, 5 Drawing Sheets

METHOD AND SYSTEM FOR AUTOMATIC RECOVERY OF A SYSTEM BASED ON DISTRIBUTED HEALTH MONITORING

BACKGROUND

Computing devices may generate data during their operation. For example, applications hosted by the computing devices may generate data. Such data may be backed up and subsequently stored in persistent storage of backup storage devices. Failure of the backup storage devices may negatively impact the ability to restore computing devices or applications executing thereon using the backups.

SUMMARY

In general, in one aspect, the invention relates to a method for managing production hosts, the method comprising obtaining, using a host monitoring agent, production host data associated with a production host, making a first determination, by the host monitoring agent and using the production host data, that the production host has violated a health-check rule, and issuing, to a recovery agent, a notification based on the first determination, wherein the recovery agent initiates a recovery action in response to receiving at least the notification.

In general, in one aspect, the invention relates to a non-transitory computer readable medium comprising computer readable program code, which when executed by a computer processor enables the computer processor to perform a method for storing data, the method comprising obtaining, using a host monitoring agent, production host data associated with a production host, making a first determination, by the host monitoring agent and using the production host data, that the production host has violated a health-check rule, and issuing, to a recovery agent, a notification based on the first determination, wherein the recovery agent initiates a recovery action in response to receiving at least the notification.

In general, in one aspect, the invention relates to a system, comprising a processor, memory comprising instructions, which when executed by the processor, perform a method, the method comprising: obtaining, using a host monitoring agent, production host data associated with a production host, making a first determination, by the host monitoring agent and using the production host data, that the production host has violated a health-check rule, and issuing, to a recovery agent, a notification based on the first determination, wherein the recovery agent initiates a recovery action in response to receiving at least the notification.

Other aspects of the invention will be apparent from the following description and the appended claims.

DETAILED DESCRIPTION

Specific embodiments will now be described with reference to the accompanying figures. In the following description, numerous details are set forth as examples of the invention. It will be understood by those skilled in the art, and having the benefit of this Detailed Description, that one or more embodiments of the present invention may be practiced without these specific details and that numerous variations or modifications may be possible without departing from the scope of the invention. Certain details known to those of ordinary skill in the art may be omitted to avoid obscuring the description.

Further, in the following description of the figures, any component described with regard to a figure, in various embodiments of the invention, may be equivalent to one or more like-named components shown and/or described with regard to any other figure. For brevity, descriptions of these components may not be repeated with regard to each figure. Thus, each and every embodiment of the components of each figure, or that is otherwise described herein, is incorporated by reference and assumed to be optionally present within every other figure and/or embodiment having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure and/or embodiment.

Throughout the application, ordinal numbers (e.g., first, second, third, etc.) may be used as an adjective for an element any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention relate to distributed monitoring of operations of production hosts and applications executing thereon. The distributed monitoring may enable more granular monitoring of production hosts and applications without increasing the overhead required to perform such monitoring, e.g., without substantially increasing the overhead on the production hosts or applications and/or without increasing the overhead of a management device that is managing the production hosts. Further, by obtaining more granular information, a recovery agent (which may be executing on the management device) may be able to take proactive actions to address potential failures in applications and/or production hosts such that clients interacting with the applications and/or production hosts are not impacted or minimally impacted.

Figure 1:
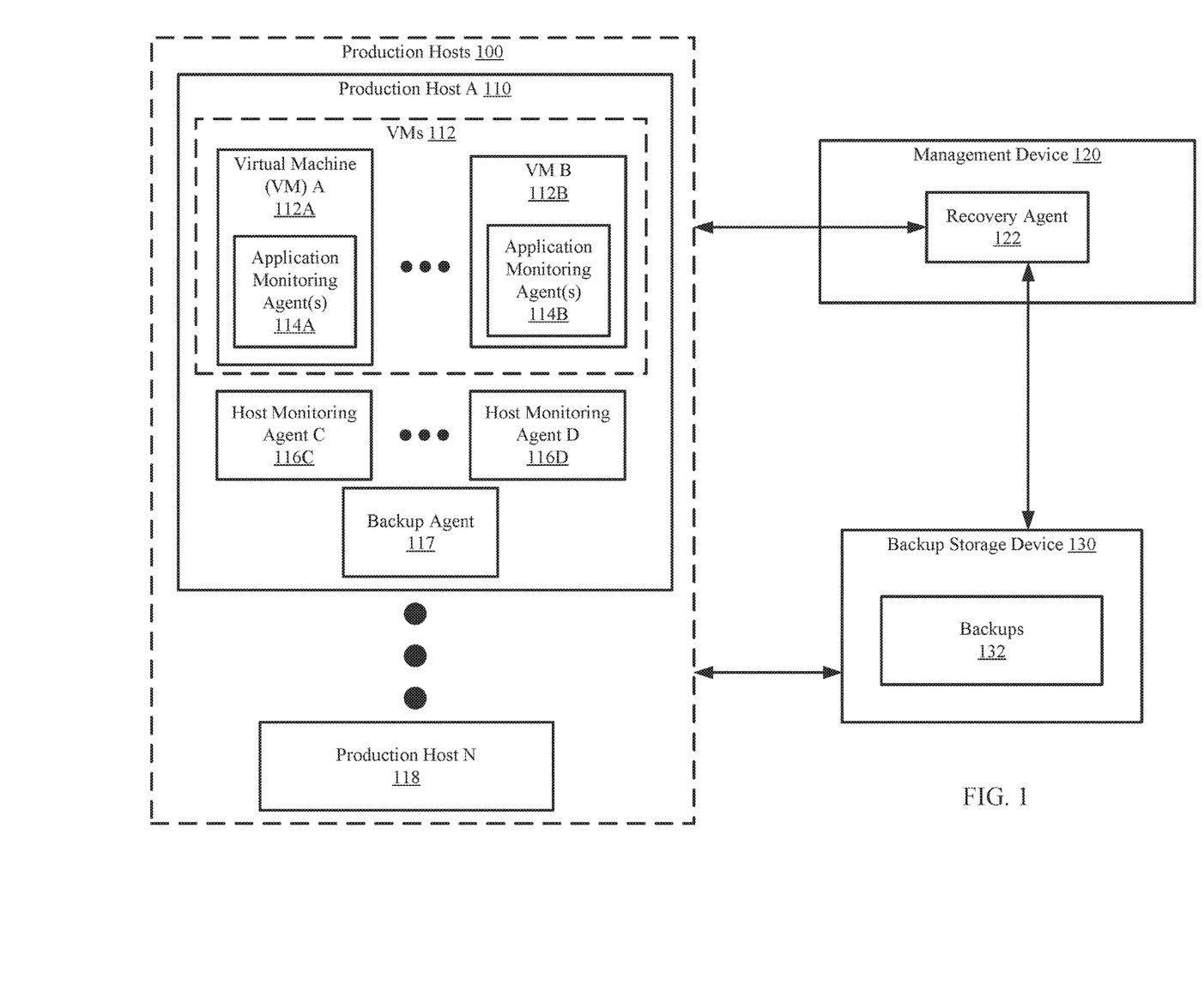
FIG. 1 shows a system in accordance with one or more embodiments of the invention.

FIG. 1 shows a diagram of a system in accordance with one or more embodiments of the invention. The system includes clients (not shown), one or more production hosts (100), a management device (120), and a backup storage device (130). The system may include additional, fewer, and/or different components without departing from the invention. Each component may be operably connected via any combination of wired and/or wireless connections. Each component illustrated in FIG. 1 is discussed below.

In one or more embodiments of the invention, the clients (not shown) are devices, operated by users, which utilize data generated by the production hosts (100). The clients may send requests to the production hosts (100) to obtain the data to be utilized.

Figure 5:
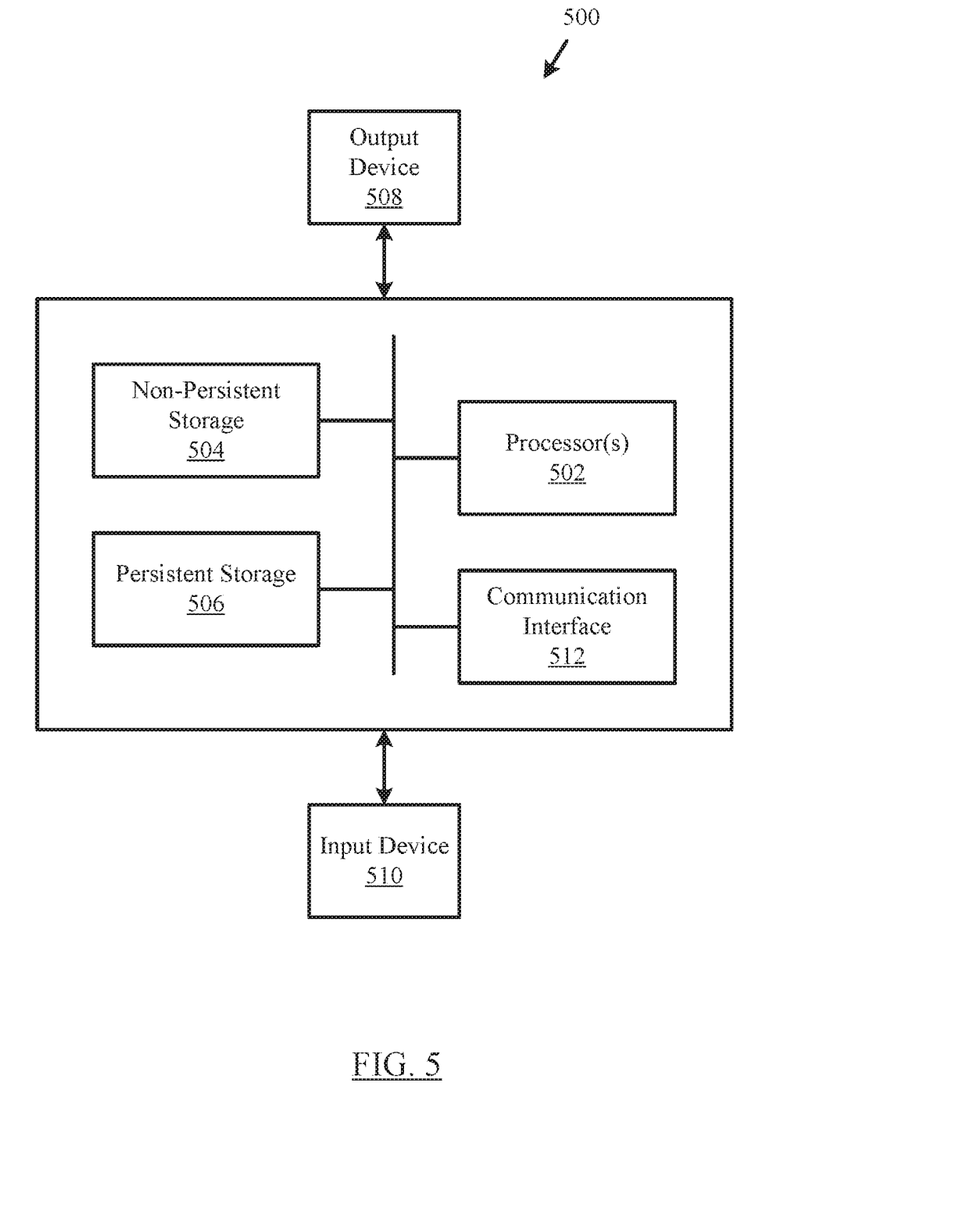
FIG. 5 shows a computing system in accordance with one or more embodiments of the invention.

In one or more embodiments of the invention, one or more clients are implemented as computing devices (see e.g., FIG. 5). A computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of a client described throughout this application.

In one or more embodiments of the invention, one or more clients are implemented as logical devices. The logical device may utilize the computing resources of any number of computing devices and thereby provide the functionality of the clients described throughout this application.

In one or more embodiments of the invention, the management device (120) is a device that monitors the operations of the production hosts (100) and determines, based on notifications received from the production hosts (or processes executing thereon), whether or not to initiate a recovery operation.

In one or more embodiments of the invention, the management device includes a recovery agent (122) that includes functionality to provide health-check rules to the production hosts, to analyze notifications from the production hosts (which may originate from the application monitoring agents (114A, 114B) and/or from the host monitoring agents (116C, 116D)), and to initiate and/or manage recovery operations based on the analysis of the notifications. In one embodiment of the invention, one or more of the aforementioned monitoring agents may be implemented as a daemon(s) executing on the production host. The daemon(s) may have a low execution priority on the production host so as to not impact the overall performance of the production host, the VMs, and/or the applications executing thereon.

Additional detail about the operation of the management device and recovery agent is provided below in FIGS. 2-4.

In one or more embodiments of the invention, the management device (120) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the management device described throughout this application.

In one or more embodiments of the invention, the management device (120) is implemented as a logical device. The logical device may utilize the computing resources of any number of computing devices and thereby provide the functionality of the management device (120) described throughout this application.

In one or more embodiments of the invention, the production hosts (100) host any number of virtual machines (VMs) (112A, 112B). In one or more embodiments of the invention, the virtual machines (112A, 112B) are implemented as computer instructions, e.g., computer code, stored on a persistent storage (e.g., on the production host (110, 118)) that when executed by a processor(s) of the production host (110, 118) cause the production host (110, 118) to provide the functionality of the virtual machines (112A, 112B) described throughout this application.

In one or more embodiments of the invention, the production host (110, 118) is implemented as a computing device (see e.g., FIG. 5). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the production host (110, 118) described throughout this application.

In one or more embodiments of the invention, the production host (110, 118) is implemented as a logical device. The logical device may utilize the computing resources of any number of computing devices and thereby provide the functionality of the production host (110, 118) described throughout this application.

In one embodiment of the invention, the production hosts (110, 118) include one or more host monitoring agents (116C, 116D), which are monitoring the operation of various components of the production hosts (e.g., processor usage, memory usage, requests per second, error rates, average response time, uptime, count of threads, count of open file descriptors, etc.). The host monitoring agents may each be configured to monitor a specific portion of the production host. Thus, there may be multiple specialized production host monitoring agents. Alternatively, the host monitoring agents may be configured to monitor the entire production host and, as such, there may only be one host monitoring agent per production host.

In one embodiment of the invention, the production hosts (110, 118) include one or more application monitoring agents (114A, 114B), which are monitoring the operation of various applications (or portions thereof). The application monitoring agents are specific to an application or a group of related applications. Further, the application monitoring agents include the appropriate application program interfaces (APIs) and/or functionality to be able to obtain application-specific information from the applications. The application specification monitoring agents may be implemented within a virtual machine in which the application they are monitoring is located, within the production host but external to the VM, and/or as a plugin within a backup agent.

Figure 2:
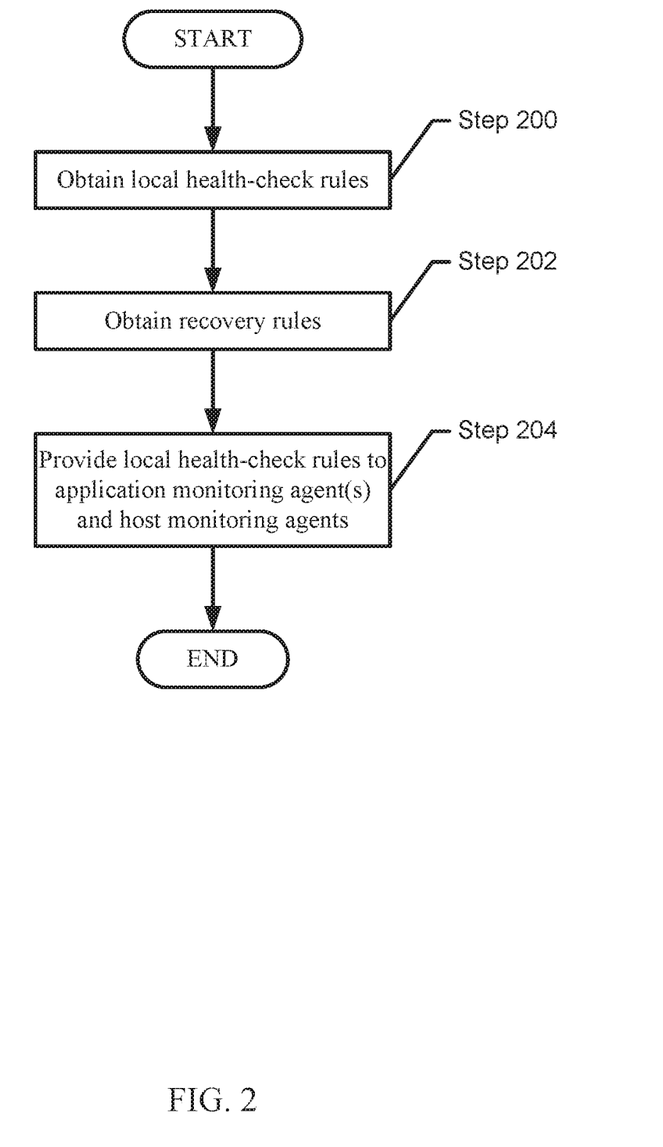
FIG. 2 shows a method for configuring the system in accordance with one or more embodiments of the invention.
Figure 3A:
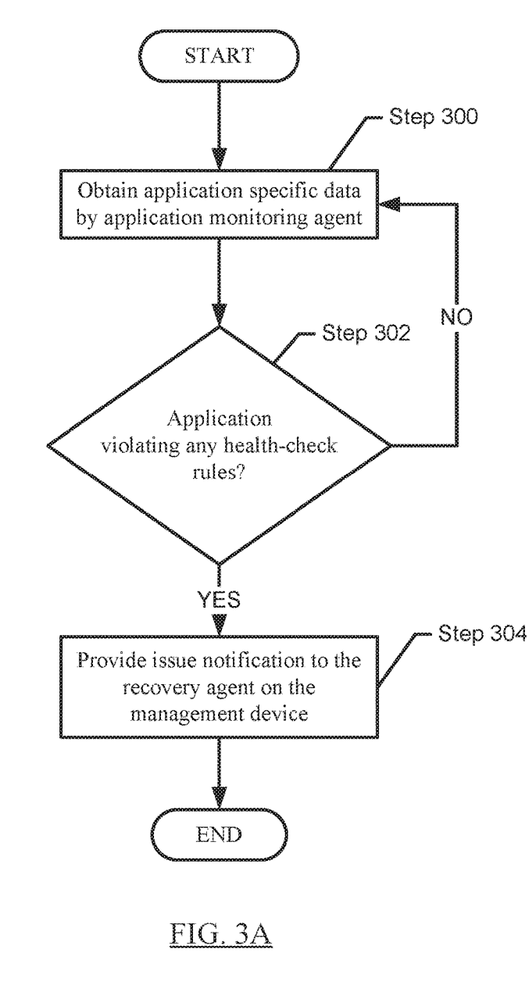
FIG. 3A shows a method for obtaining application specific data in accordance with one or more embodiments of the invention.
Figure 3B:
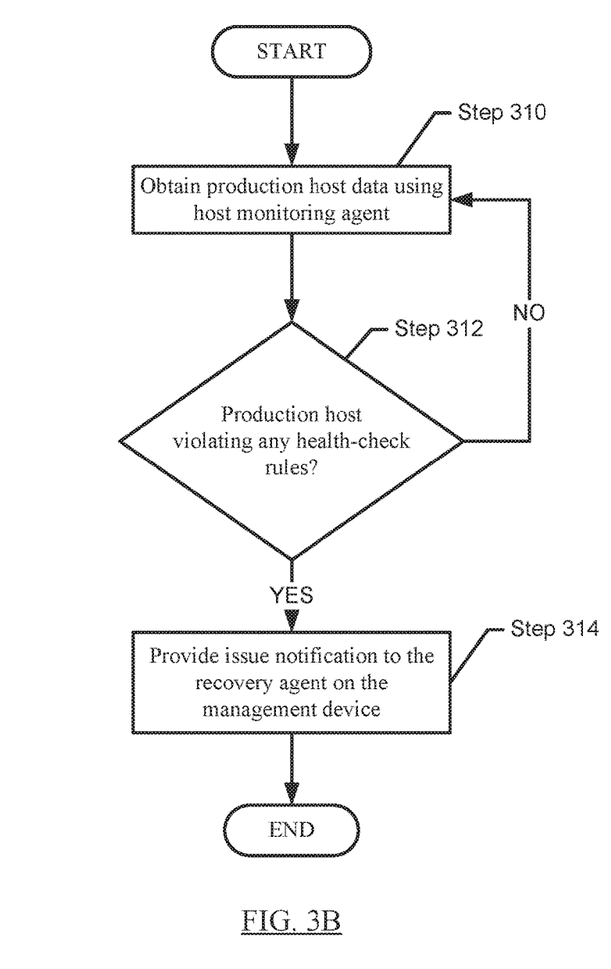
FIG. 3B shows a method for obtaining production host data in accordance with one or more embodiments of the invention.
Figure 4:
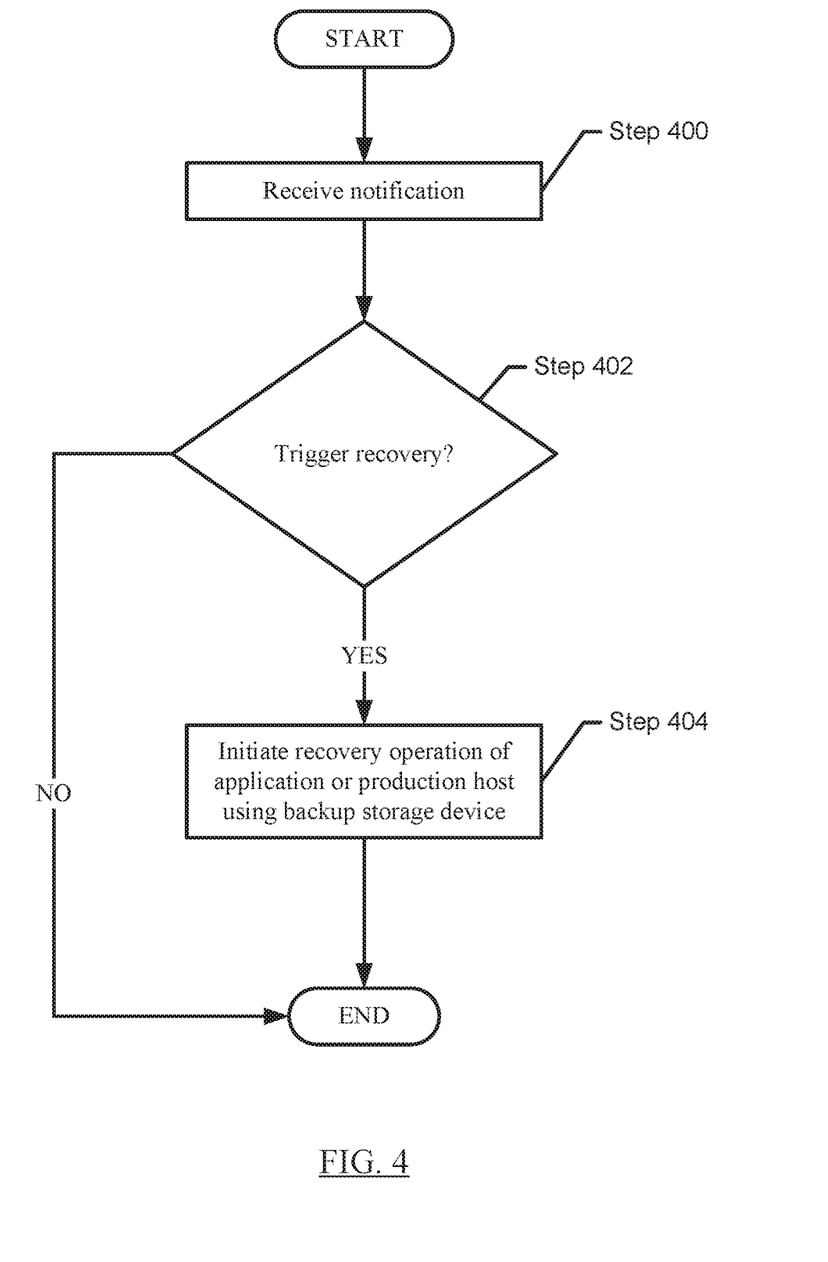
FIG. 4 shows a method for processing notifications by a recovery agent in accordance with one or more embodiments of the invention.

Additional detail about the aforementioned agents is provided in FIGS. 2-4.

In one embodiment of the invention, the production hosts may include backup agents (e.g., 117) that include functionality to generate backups and to recover virtual machines (or applications thereon from backups), where the backup agents managed or initiated by the recovery agent. In one or more embodiments of the invention, the backup agents are implemented as computer instructions, e.g., computer code, stored on a persistent storage that when executed by a processor of the production host (110, 118) cause the production host (110, 118) to perform the aforementioned functionality as well as any other functionality that is described throughout this application.

In one or more of embodiments of the invention, the backup agent, the host monitoring agents and the application monitoring agents are implemented as computer instructions, e.g., computer code, stored on a persistent storage (e.g., on the production host (110, 118)) that when executed by a processor(s) of the production host (110, 118) cause the production host (110, 118) to provide the functionality of the aforementioned agents as described throughout this application.

In one or more embodiments of the invention, the backup storage device (130) manages the backups of virtual machines hosted by the production hosts (110, 118). In one or more embodiments of the invention, the backup storage device (130) stores backups (132) in persistent storage of the backup device or in persistent storage operatively connected to the backup device. The backups (132) may be virtual machine backups. In one or more embodiments of the invention, the virtual machine backups include backups of one or more virtual machines (112A, 112B). A backup may be a data structure that may be used to recover a virtual machine to a previous point in time. The backup may include data of the virtual machine, encrypted data of the virtual machine, metadata that references the data of the virtual machine, and/or other data associated with the virtual machine without departing from the invention.

In one or more embodiments of the invention, the backup storage device (130) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality described throughout this application and/or all, or a portion thereof, of the methods illustrated in FIG. 4.

FIGS. 2-4 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2-4 may be performed in parallel with any other steps shown in FIGS. 2-4 without departing from the scope of the invention.

FIG. 2 shows a method for configuring the system in accordance with one or more embodiments of the invention. The method shown in FIG. 2 may be performed by the recovery agent.

In step 200, the recovery agent obtains one or more local health-check rules. The local health-check rules are rules that are to be implemented by the host monitoring agents and the application monitoring agents in order to determine whether to issue a notification to the management device. The local health-check rules may specify, for example, the type of data that is being monitored (e.g., CPU usage data, application I/O rate data, application database size, etc.) and one or more rules associated with the data. The rules may be of any level of complexity.

For example, a rule may specify a threshold value and if the monitored data exceeds the threshold value, then a notification issued. In another example, the rule may specify a threshold value as well as period of time during which the monitored data needs to exceed the threshold value for a notification to be issued (e.g., if the data is CPU usage data, then the CPU usage data may need to exceed the CPU usage threshold of 80% for at least five minutes in order to trigger a notification). In another example, the rule may specify that if an application exceeds an average response time for five request, then a notification is triggered. The invention is not limited to the aforementioned examples.

The local health-check rules may be obtained from a client, included as default local health-check rules in the recovery agent, obtained from another external source, or any combination thereof.

In step 202, the recovery agent obtains recovery rules. The recovery rules specify how the recovery agent analyzes the notifications issued by the agents executing on the production hosts in order to determine whether to initiate a recovery operation. The recovery rules may be of any level of complexity. For example, a recovery rule may specify a set of notifications that must be received within a specific time period in order to initiate a recovery operation. In this example, the notifications may include information about changes to processor consumption, changes to memory consumption, frequency of disk failures on a production host, etc. The specified set of notifications may provide a more complete picture of the production hosts "health" and whether or not the its "health" is at a level that failure is highly likely such that a recovery operation should be initiated.

In one embodiment of the invention, a recovery operation may include, but is not limited to, initiation of a new VM on a production host using a corresponding backup stored on a backup device and a proactive initiation of a new application instance on a new or existing VM on a production host using a corresponding backup stored on a backup device.

The recovery rules may be obtained from a client, included as default recovery rules in the recovery agent, obtained from another external source, or any combination thereof.

In step 204, the local health-check rules are provided to the application monitoring agents and host monitoring agents. In one embodiment of the invention, the application monitoring agents and host monitoring agents are loaded onto the production hosts prior to step 204. In another embodiment of the invention, the application monitoring agents and host monitoring agents are loaded onto the production hosts as part of step 204. The backup agent that is present on the production hosts may facilitate the loading of the application monitoring agents and host monitoring agents on the production host.

In one embodiment of the invention, one or more host monitoring agents and/or application monitoring agents may be implemented as plugins in the backup agent. In such scenarios, the plugins may be installed and configured with the local health-check rules in step 204.

Though not shown in FIG. 2, the local health-check rules may be updated from time to time. In such scenarios, the recovery agent may use a push or pull mechanism to provide the local health-check rules to the production hosts.

FIG. 3A shows a method for obtaining application specific data in accordance with one or more embodiments of the invention. The method shown in FIG. 3A may be performed by an application monitoring agent.

In step 300, application specific data is obtained by the application monitoring agent. The application specific data may be obtained, e.g., by an application programming interface (API) exposed by the application. The application specific data may be stored in volatile storage, persistent storage, or a combination thereof in the production host.

In step 302, a determination is made about whether the application (i.e., the application from which the application specific data was obtained) is violating any local health check rules. If the application is violating the local health-check rules, then the process proceeds to step 304; otherwise, the process ends.

The determination in step 302 may be made on a per local health-check rule basis. For example, if there are three local health-check rules associated with the application specific data or the application, then a determination is made about whether any of the local health-check rules is violated. In this context, a local health-check rule is violated when the result of applying the local health-check rules requires the issuance of a notification to the recovery agent.

As noted above, some local health-check rules may be based on application specific data that is obtained over time. In this scenario, the application specific data may be locally stored and then as new application specific data is received, a determination is made using the combination of the newly received application specific data as well as the temporarily stored application specific data. In order not to overwhelm the storage resources of the production host, the application specific data may only be retained on the production host (in either temporary storage or persistent storage) for a finite period of time. The specific period of the retention time may vary based on the application specific data and the associated local health-check rules. For example, if the local health-check rules are based on application specific data that is received over a one hour period, the application specific data is retained for at least one hour. The example is not intended to limit the scope of the invention.

In step 304, a notification is issued to the recovery agent on the management device. The notification may include information about the application that is in violation of one or more local health-check rules, the one or more local health-check rules that have been violated, and/or the application specific data that triggered the violation. The notification may include additional, different, and/or less information without departing from the invention.

FIG. 3B shows a method for obtaining production host data in accordance with one or more embodiments of the invention. The method shown in FIG. 3B may be performed by a host monitoring agent.

In step 310, production host data is obtained by the host monitoring agent. The production host data may be stored in volatile storage, persistent storage, or a combination thereof in the production host.

In step 312, a determination is made about whether the production host (i.e., the production host from which the production host data was obtained) is violating any local health-check rules. If the production host is violating the local health-check rules, then the process proceeds to step 314; otherwise, the process ends.

The determination in step 312 may be made on a per local health-check rule basis. For example, if there are two local health-check rules associated with the production host data, then a determination is made whether any of the local health-check rules are violated. In this context, a local health-check rule is violated when the result of applying the local health-check rules requires the issuance of a notification to the recovery agent.

As noted above, some local health-check rules may be based on production host data that is obtained over time. In this scenario, the production host data may be locally stored and as new production host data is received, a determination is made using the combination of the newly received production host data as well as the temporarily stored production host data. In order not to overwhelm the storage resources of the production host, the production host data may only be retained on the production host (in either temporary storage or persistent storage) for a finite period of time. The specific period of the retention time may vary based on the production host data and the associated local health-check rules. For example, if the local health-check rules are based on production host data that is received over one-hour period, the production host data is retained for at least one hour. The example is not intended to limit the scope of the invention.

In step 314, a notification is issued to the recovery agent on the management device. The notification may include information about the production host that is in violation of one or more local health-check rules, the one or more local health-check rules that have been violated, and/or the production host data that triggered the violation. The notification may include additional, different, or less information without departing from the invention.

FIG. 4 shows a method for processing notifications by a recovery agent in accordance with one or more embodiments of the invention. The method shown in FIG. 4 may be performed by the recovery agent.

In step 400, a notification is received from an agent (e.g., an application monitoring agent, a host monitoring agent) on a production host.

In step 402, a determination is made about whether the notification triggers initiation of a recovery operation. If the notification triggers initiation of a recovery operation, then the process proceeds to step 404; otherwise, the process ends.

The determination in step 402 may be made on a per recovery rule basis. For example, if there are multiple recovery rules associated with the notification, then a determination is made whether any of the recovery rules are violated. In this context, a recovery rule is violated when the result of applying the recovery rule requires the initiation of a recovery operation.

As noted above, some recovery rules may be based on notifications that are obtained over time. In this scenario, the notifications may be locally stored and as new notifications are received, a determination is made using the combination of the newly received notifications as well as the temporarily stored notifications. In order not to overwhelm the storage resources of the management device, the notifications may only be retained on the management device (in either temporary storage or persistent storage) for a finite period of time. The specific period of the retention time may vary based on the notifications and the associated recovery rules.

In step 404, a recovery operation is initiated. More specifically, based on the notification(s) and the recovery rule which was violated, an appropriate recovery operation may be initiated.

For example, if the notifications trigger a recovery rule which specifies that a production host will likely fail in the next four hours when a certain set of notifications are received, then the recovery operation may include identifying a new production host and instantiating new VMs on the new production host using the corresponding backups on the backup storage device. Once the new production host is operational and the new VMs have been instantiated, the workload of the production host that is likely to fail is gracefully transitioned to the new production host. The aforementioned initiation and/or subsequent transitioning of the workload may also be part of the recovery operation.

In another example, if the notifications trigger a recovery rule which specifies that a production host will need an application upgrade, then the recovery operation may include identifying a new production host and instantiating a new on the new production host using the last known full backup on the backup storage device. This will allow recovery of application to a new production host without any service downtime as an instance of the current version of the application is executing on the new production host and the other instance of the application that is executing on the other production host may be upgraded.

The aforementioned examples are not intended to limit the scope of the invention.

As discussed above, embodiments of the invention may be implemented using computing devices. FIG. 5 shows a diagram of a computing device in accordance with one or more embodiments of the invention. The computing device (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the invention, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN) such as the Internet, mobile network, or any other type of network) and/or to another device, such as another computing device.

In one embodiment of the invention, the computing device (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention may improve the reliability of computing devices by providing a distributed health-check mechanism, which enables production hosts to perform granular local health-check operations while not negatively impacting the performance of the production hosts. Further, by utilizing local health-check rules to minimize notifications being issued to the management device, the distributed health-check mechanism may have a minimal impact on the network bandwidth between the production hosts and the management devices, while still provide a high-level of health-checking functionality.

Thus, embodiments of the invention may address the data loss due to failed (or failing) computing resources. This problem arises due to the technological nature of the environment in which clients interact with the production hosts but if the production hosts fails then the clients are negatively impacted until the production host that failed can be recovered.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing production hosts, the method comprising:
   obtaining, using a host monitoring agent, production host data associated with a production host of a plurality of production hosts,
   wherein:
      the host monitoring agent monitors operations of the production hosts and determines, based the product host data, whether or not to initiate a recovery operation, and
      the production hosts host one or more virtual machines;
   making a first determination, by the host monitoring agent and using the production host data, that the production host has violated a health-check rule; and
   issuing, to a recovery agent, a notification based on the first determination,
   wherein the recovery agent initiates a recovery action in response to receiving at least the notification.

2. The method of claim 1, further comprising:
   obtaining, using an application monitoring agent, application specific data associated with an application executing on the production host,
   wherein:
      the application monitoring agent is specific to one of a group consisting of the application or a group of related applications, and
      the application monitoring agent is implemented within a virtual machine of the production host;
   making a second determination, by the application monitoring agent and using the production host data, that the application has violated a second health-check rule; and
   issuing, to the recovery agent, a second notification based on the second determination,
   wherein the recovery agent further initiates the recovery action in response to receiving the second notification.

3. The method of claim 2, further comprising:
   obtaining, from the recovery agent, the health-check rule and the second health check-rule.

4. The method of claim 1, further comprising:
obtaining, using the host monitoring agent, second production host data associated with the production host;
making a second determination, by the host monitoring agent and using the production host data, that the production host has not violated a second health-check rule; and
based on the second determination, not providing the second production host data to the recovery agent.

5. The method of claim 1, wherein the host monitoring agent is implemented as a daemon executing on the production host.

6. The method of claim 5, wherein the daemon has a low execution priority on the production host.

7. The method of claim 1,
wherein production host comprises a backup agent,
wherein the backup agent is configured to interact with a backup storage device to generate backups of at least a portion of the production host,
wherein the host monitoring agent is a plug-in executing in the backup agent.

8. A non-transitory computer readable medium comprising computer readable program code, which when executed by a computer processor enables the computer processor to perform a method for storing data, the method comprising:
obtaining, using a host monitoring agent, production host data associated with a production host of a plurality of production hosts,
wherein:
the host monitoring agent monitors operations of the production hosts and determines, based on the production host data, whether or not to initiate a recovery operation, and
the production hosts host one or more virtual machines;
making a first determination, by the host monitoring agent and using the production host data, that the production host has violated a health-check rule; and
issuing, to a recovery agent, a notification based on the first determination,
wherein the recovery agent initiates a recovery action in response to receiving at least the notification.

9. The non-transitory computer readable medium of claim 8, wherein the method further comprises:
obtaining, using an application monitoring agent, application specific data associated with an application executing on the production host,
wherein:
the application monitoring agent is specific to one of a group consisting of the application or a group of related applications, and
the application monitoring agent is implemented within a virtual machine of the production host;
making a second determination, by the application monitoring agent and using the production host data, that the application has violated a second health-check rule; and
issuing, to the recovery agent, a second notification based on the second determination,
wherein the recovery agent further initiates the recovery action in response to receiving the second notification.

10. The non-transitory computer readable medium of claim 9, wherein the method further comprises:
obtaining, from the recovery agent, the health-check rule and the second health check-rule.

11. The non-transitory computer readable medium of claim 8, wherein the method further comprises:
obtaining, using the host monitoring agent, second production host data associated with the production host;
making a second determination, by the host monitoring agent and using the production host data, that the production host has not violated a second health-check rule; and
based on the second determination, not providing the second production host data to the recovery agent.

12. The non-transitory computer readable medium of claim 8, wherein the host monitoring agent is implemented as a daemon executing on the production host.

13. The non-transitory computer readable medium of claim 12, wherein the daemon has a low execution priority on the production host.

14. The non-transitory computer readable medium of claim 8,
wherein production host comprises a backup agent,
wherein the backup agent is configured to interact with a backup storage device to generate backups of at least a portion of the production host,
wherein the host monitoring agent is a plug-in executing in the backup agent.

15. A system, comprising:
a processor;
memory comprising instructions, which when executed by the processor, perform a method, the method comprising:
obtaining, using a host monitoring agent, production host data associated with a production host of a plurality of production hosts,
wherein:
the host monitoring agent monitors operations of the production hosts and determines, based on the production host data, whether or not to initiate a recovery operation, and
the production hosts host one or more virtual machines;
making a first determination, by the host monitoring agent and using the production host data, that the production host has violated a health-check rule; and
issuing, to a recovery agent, a notification based on the first determination,
wherein the recovery agent initiates a recovery action in response to receiving at least the notification.

16. The system of claim 15, wherein the method further comprises:
obtaining, using an application monitoring agent, application specific data associated with an application executing on the production host,
wherein:
the application monitoring agent is specific to one of a group consisting of the application or a group of related applications, and
the application monitoring agent is implemented within a virtual machine of the production host;
making a second determination, by the application monitoring agent and using the production host data, that the application has violated a second health-check rule; and
issuing, to the recovery agent, a second notification based on the second determination,
wherein the recovery agent further initiates the recovery action in response to receiving the second notification.

17. The system of claim 16, wherein the method further comprises:
   obtaining, from the recovery agent, the health-check rule and the second health check-rule.

18. The system of claim 15, wherein the method further comprises:
   obtaining, using the host monitoring agent, second production host data associated with the production host;
   making a second determination, by the host monitoring agent and using the production host data, that the production host has not violated a second health-check rule; and
   based on the second determination, not providing the second production host data to the recovery agent.

19. The system of claim 15, wherein the host monitoring agent is implemented as a daemon executing on the production host.

20. The system of claim 19, wherein the daemon has a low execution priority on the production host.

* * * * *